United States Patent [19]

Chang et al.

[11] Patent Number: 5,693,185
[45] Date of Patent: Dec. 2, 1997

[54] METHOD OF OXIDATIVELY TREATING A SUBSTRATE WITH AN EQUILIBRIUM MIXTURE OF CARO'S ACID AND A PERCARBOXYLIC ACID

[75] Inventors: Hou-Min Chang; Hasan Jameel; Junfu Song, all of Raleigh, N.C.; Dingru Pan, Beijing, China; Bijan Amini, Moorestown, N.J.; John Robert Webster, Wilmington; Bruce A. Evans, Hockessin, both of Del.

[73] Assignees: North Carolina State University, Raleigh, N.C.; E. I. Du Pont de Nemours and Company, Wilmington, Del.

[21] Appl. No.: 705,997

[22] Filed: Aug. 30, 1996

Related U.S. Application Data

[60] Division of Ser. No. 123,532, Sep. 17, 1993, Pat. No. 5,589,032, which is a continuation-in-part of Ser. No. 948,122, Sep. 21, 1992, abandoned.

[51] Int. Cl.$^6$ .................................................. D21C 8/16
[52] U.S. Cl. ..................... 162/76; 162/78; 162/95; 162/99; 8/107; 8/111
[58] Field of Search ..................... 8/107, 110, 111; 162/76, 78, 99, 95, 96, 97, 98; 562/2, 6; 252/186.21, 186.22, 186.23, 186.43, 186.42, 186.29

[56] References Cited

U.S. PATENT DOCUMENTS

| | | | |
|---|---|---|---|
| 4,278,615 | 7/1981 | Stober | 562/6 |
| 4,334,897 | 6/1982 | Goedecke et al. | 562/6 |
| 4,400,237 | 8/1983 | Krueger et al. | 162/76 |
| 4,793,898 | 12/1988 | Laamanen et al. | 162/76 |
| 5,220,052 | 6/1993 | Troughton et al. | 562/6 |
| 5,246,543 | 9/1993 | Meier et al. | 162/76 |

FOREIGN PATENT DOCUMENTS

| | | | |
|---|---|---|---|
| 0415149 | 3/1991 | European Pat. Off. | |
| 0761647 | 9/1980 | U.S.S.R. | 162/76 |

*Primary Examiner*—Steven Alvo
*Attorney, Agent, or Firm*—Richard E. Jenkins, P.A.

[57] ABSTRACT

A process for treating a substrate, e.g., lignocellulosic pulp or cellulosic pulps, with a mixed peracid solution comprising percarboxylic acid and Caro's acid which results in a higher conversion rate of the active oxygen in the hydrogen peroxide in order to provide an inexpensive and effective delignification and/or bleaching solution and the process for making the mixed peracid solution.

9 Claims, 3 Drawing Sheets

1 Pxa Op
2 Pxa OpPxa(Op/Eop)
3 Pxa OpPxa(Op/Eop)Pxa
4 Pxa OpPxa(Op/Eop)PxaP
5 Pxa OpPxa(Op/Eop)PxaPP

1. Pxa Op
2. Pxa OpPxa(Op/Eop)
3. Pxa OpPxa(Op/Eop)Pxa
4. Pxa OpPxa(Op/Eop)PxaP
5. Pxa OpPxa(Op/Eop)PxaPP

METHOD OF OXIDATIVELY TREATING A SUBSTRATE WITH AN EQUILIBRIUM MIXTURE OF CARO'S ACID AND A PERCARBOXYLIC ACID

RELATED APPLICATIONS

This Application is a Divisional of Applicants' application Ser. No. 08/123,532 filed Sep. 17, 1993, now U.S. Pat. No. 5,589,032, which is a Continuation-in-Part of applicants' application Ser. No. 07/948,122 filed Sep. 21, 1992, now abandoned.

BACKGROUND OF THE INVENTION

The present invention relates to a process for oxidatively treating a substrate, e.g., a lignocellulosic material, with a mixed peracid solution which is an equilibrium mixture of Caro's acid and a percarboxylic acid and to improved methods for preparing such mixed peracid solutions. The present invention also relates to delignifying and bleaching lignocellulosic materials, and to an improved process for bleaching cellulosic materials, e.g., cotton, with such mixed peracid solutions.

It is known to use peracetic acid bleaching in the pulp and paper industry, but such bleaching processes are too expensive and have had too many other shortcomings to be commercially viable. Applicants have discovered quite unexpectedly and surprisingly that by adding a carboxylic acid, e.g., acetic acid to Caro's acid ($H_2SO_4 + H_2O_2 \Longleftrightarrow H_2SO_5 + H_2O$) the conversion of the hydrogen peroxide reactant, to a mixture of peracetic acid and Caro's acid, is substantially increased, without the need for distillation of the peracitic acid, and such mixed peracids solutions have highly desirable pulp delignification and brightening capabilities.

SUMMARY OF THE INVENTION

In accordance with the present invention, applicants provide a process for preparing a mixed peracid solution which is an equilibrium mixture of Caro's acid ($H_2SO_4 + H_2O_2 \Longleftrightarrow H_2SO_5 + H_2O$) and a percarboxylic acid ($RCO_2H + H_2O_2 \Longleftrightarrow RCO_3H + H_2O$), wherein R is an alkyl group having 1–5 carbon atoms which is useful as an oxidizing agent and/or a bleaching agent. The process comprises mixing the carboxylic acid with Caro's acid whereby the addition of the carboxylic acid to Caro's acid serves to increase the conversion of hydrogen peroxide to a mixture of peracids, without the need for a distillation step to remove the percarboxylic acid so formed. In an alternate embodiment of the invention, the sulfuric acid and carboxylic acid components can be premixed and added to hydrogen peroxide to achieve the same desired high conversion of peroxide to the mixed peracid solution of the invention.

In accordance with the present invention, applicants also provide an improved process for bleaching cellulosic substrates, such as, for example, delignified pulp, cotton or cotton by-products with the mixed peracid solution of the invention. These mixed peracid solutions can also be used in one or more stages of a pulping process to delignify and/or bleach lignocellulosic pulps. Further, the pulps treated with the mixed peracid solutions can previously or subsequently be subjected to other oxidative agents such as oxygen, peroxide, alkali extraction (with or without an oxidant), chlorine, chlorine dioxide and ozone and can also be treated with a variety of chemical agents and subjected to various other process steps.

In practicing the invention, the carboxylic acid, which is preferably a 1–5C carboxylic acid, for example formic, acetic, propionic, butyric, or valetic acid, or a 2–6C dicarboxylic acid, for example oxalic, malonic, succinic, glutaric, or adipic acid, is mixed with Caro's acid in such respective amounts that the overall conversion of hydrogen peroxide, which would normally be about 50%, to peracid can be increased to about 60–90% while maintaining the mole ratio of carboxylic acid to initial peroxide in the range of from 0.3 to 1.5, but preferably about 0.5–1.2. Alternatively, the added carboxylic acid can be a substituted acid, an aromatic acid or a substituted aromatic acid.

Substrates contemplated for treatment with the mixed peracid solution of the invention include lignocellulosic and cellulosic materials, such as wood, wood chips, cotton and cotton by-products, and non-wood plants such as grasses, straw bamboo, kenaf, and the like. Lignocellulosic material that have been fiberized in chemical processes, mechanical processes, or combinations thereof such as Kraft, sulfite, soda, NSSC, Organosolv, Thermochemical, Chemithermomechanical pulping are particularly suitable for treatment by the peracid solution of the invention.

DETAILED DESCRIPTION OF THE INVENTION

The present invention is an improved process for preparing a mixed peracid solution which comprises mixing a carboxylic acid of the formula $RCO_2H$, wherein R is an alkyl group of from 1 to 5 carbon atoms with Caro's acid (represented by the equilibrium equation $H_2SO_4 + H_2O_2 \Longleftrightarrow H_2SO_5 + H_2O$) in such respective amounts that the overall conversion of the hydrogen peroxide component ($H_2O_2$) can be increased to a value in the range of 60–90% while maintaining a mole ratio of carboxylic acid to initial hydrogen peroxide of 0.3 to 1.5, but preferably 0.5–1.2. The mole ratio of sulfuric acid to initial hydrogen peroxide is 0.3–3.0, preferably 0.4–1.5. The mixed peracid solution which results has highly desirable oxidative, pulp delignification and bleaching properties. The mixed peracid solution is an equilibrium mixture of Caro's acid ($H_2SO_4 + H_2O_2 \Longleftrightarrow H_2SO_5 + H_2O$) and the percarboxylic acid component ($RCO_2H + H_2O_2 \Longleftrightarrow RCO_3H + H_2O$).

By adding acetic acid to a Caro's acid mixture produced from a 50 wt. % hydrogen peroxide and a 93 wt. % sulfuric acid solution as shown in greater detail in Example 3, the overall conversion of peroxide to peracid can be increased from 42% to 80%. In Example 3 the mole ratio of acetic acid to the initial amount of peroxide is shown as 1.0. To achieve a similar conversion of peroxide to peracetic acid using 50 wt. % peroxide by previously known equilibrium methods would require approximately 6 to 7 moles of acetic acid per mole of hydrogen peroxide.

Figure 1:
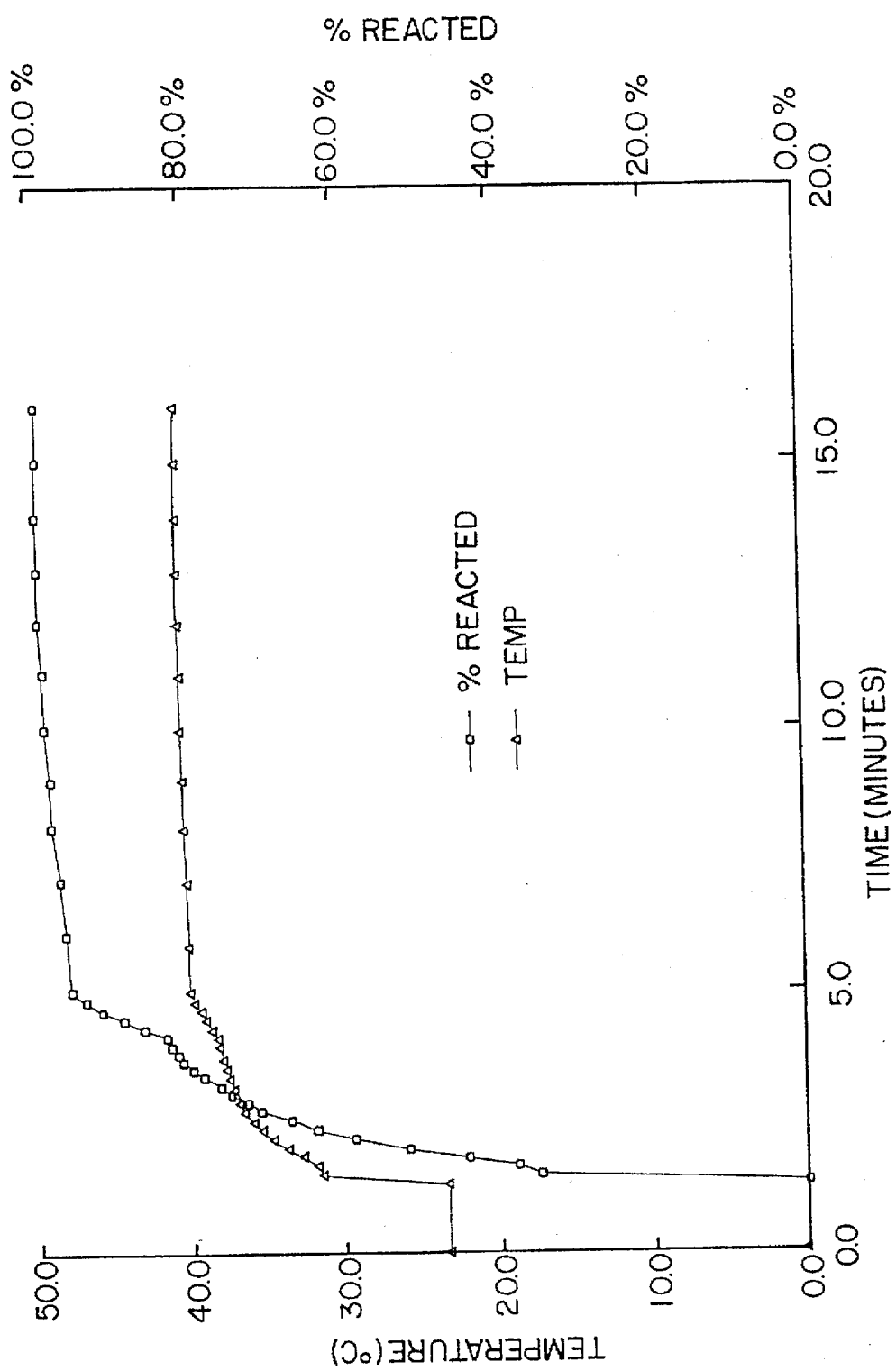
FIG. 1 is a graph illustrating the measurement of the heat of the reaction of acetic acid with Caro's acid over a period of time (20 minutes)

The results obtained in the instant invention suggest that the acetic acid is partially converted to peracetic acid, and that the sulfuric acid and/or peroxymonopersulfuric acids act as the acid catalyst needed for the reaction. Although the total amount of peracid in the final mixture can be measured experimentally, the actual distribution of the peracids ($H_2SO_5$ and $CH_3CO_3H$) is not known. From the measurement of the heat of reaction of acetic acid with the Caro's acid, it appears that the reaction is rapid and is complete in about 10 minutes (see FIG. 1 of the drawings).

Although the use of 50% hydrogen peroxide and 93% sulfuric acid is preferred for on-site generation of the peracid mixture, it is recognized that similar results can be achieved when the strength of the sulfuric acid and/or hydrogen peroxide is lower or higher. The practical range for these reagents is 90–99% $H_2SO_4$ and 35–70 wt. % $H_2O_2$. The actual choice of reagents would depend on availability of the raw materials, but in general the preferred range would be 93–99% $H_2SO_4$ and 50–70 wt. % $H_2O_2$. The concentration of $H_2O_2$ can be dictated by the respective amounts of carboxylic acid and $H_2SO_4$ utilized in the process of this invention (per 1 mole of $H_2O_2$). At certain low ratios of carboxylic acid and $H_2SO_4$, respectively, to $H_2O_2$, one needs to utilize a sufficiently high concentration of $H_2O_2$ to reach the overall conversion of hydrogen peroxide to approximately 60–90%.

Although the process described in the examples is a batch operation, it is recognized by those skilled in the art that the process can also be run continuously. In addition, the order, the amount and the manner of addition of the reagents are not critical, and they can be changed as desired to achieve the objectives of the invention.

It is evident from the disclosure and the examples that the mixed peracid solution obtained from the process of the invention can be used economically and conveniently to treat a variety of substrates, including lignocellulosic and cellulosic materials, such as, for example, wood, wood chips, delignified pulp, cotton, cotton by-products, and non-wood plants such as grasses, straw, bamboo, kenaf and the like. Lignocellulosic pulps from Kraft, sulfite, soda and other pulping operations as well as pulp from recycled paper are especially suitable for treatment according to the invention. As can be appreciated from the above and the examples that follow, the process of this invention utilizes a non-chlorine bleaching agent for the oxidative treatment of substrates in the particular process step which utilizes the mixed peracid solution of this invention.

The invention will now be described through the following examples which do not restrict the invention but merely further illustrate the best mode contemplated by the applicants for the practice of the invention.

EXAMPLE 1

Preparation of Caro's Acid

To a jacketed round-bottom-flask, equipped with a thermometer, agitator and a dropping funnel was added 72.9 g (1.5 moles) of 70% hydrogen peroxide. Agitation rate was set at 400 RPM and 35° C. water, from a constant temperature bath, was circulated around the jacket of the flask. The dropping funnel was filled with 225.4 g (2.25 moles) of sulfuric acid (97.9 wt. % H2SO4) and the acid was added dropwise to the cooled mixture over a one hour period while the reactor's temperature was kept within a range of 40°–45° C. The mixture was stirred for approximately 45 minutes and analyzed to determine the conversion of hydrogen peroxide to Caro's acid ($H_2SO_5$). The results are shown below:

| | | | |
|---|---|---|---|
| $H_2SO_4$ | 36.15 wt. % | 107.83 g | 1.10 moles |
| $H_2SO_5$ | 43.24 wt. % | 128.98 g | 1.13 moles |
| $H_2O_2$ | 3.93 wt. % | 11.72 g | 0.35 moles |
| Active[a] Oxygen | 6.06 wt. % | 18.08 g | 1.13 moles |

[a]Active Oxygen measured as $H_2SO_5$

Based on these results the calculated $H_2O_2$ conversion to $H_2SO_5$ was $(1.13/1.50)\times100=75\%$.

EXAMPLE 2

Preparation of Caro's Acid

To a jacketed round-bottom-flask, equipped with a thermometer, agitator and a dropping funnel was added 102.1 g (1.5 moles) of 50% hydrogen peroxide. Agitation rate was set at 400 RPM and 32° C. water, from a constant temperature bath, was circulated around the jacket of the flask. The dropping funnel was filled with 238.5 g (2.25 moles) of sulfuric acid (92.5 wt. % $H_2SO_4$) and the acid was added dropwise to the cooled mixture over a one hour period while the reactor's temperature was kept within a range of 40°–45° C. The mixture was stirred for approximately 45 minutes and analyzed to determine the conversion of hydrogen peroxide to Caro's acid ($H_2SO_5$). The results are shown below:

| | | | |
|---|---|---|---|
| $H_2SO_4$ | 47.06 wt. % | 160.29 g | 1.63 moles |
| $H_2SO_5$ | 19.90 wt. % | 67.78 g | 0.59 moles |
| $H_2O_2$ | 8.79 wt. % | 29.94 g | 0.88 moles |
| Active[a] Oxygen | 2.79 wt. % | 9.50 g | 0.59 moles |

[a]Active Oxygen measured as $H_2SO_5$

Based on these results the calculated $H_2O_2$ conversion to $H_2SO_5$ was $(0.59/1.50)\times100=40\%$.

EXAMPLE 3

A. Preparation of Caro's Acid

To a one liter jacketed baffled resin kettle, equipped with a thermometer, agitator and a dropping funnel was added 194.4 g (4.0 moles) of 70% hydrogen peroxide. The peroxide was then diluted with 97.6 g of deionized water (See Note a below). Agitation rate was set at 250 RPM and 25° C. water, from a constant temperature bath, was circulated around the jacket of the flask. The dropping funnel was filled with concentrated sulfuric acid (96 wt. % $H_2SO_4$) and the initial rate of addition of sulfuric acid was set at a rate that allowed the reaction mixture to reach a temperature of about 45° C. The addition rate was then reduced and adjusted as needed to maintain the temperature within a range of 40°–45° C. A total of 613 g (6.0 moles) of sulfuric acid was added. The mixture was stirred for approximately 30 minutes and analyzed to determine the conversion of hydrogen peroxide to Caro's acid ($H_2SO_5$). The results are shown below:

| | | | |
|---|---|---|---|
| $H_2SO_4$ | 46.0 wt. % | 416.3 g | 4.2 moles |
| $H_2SO_5$ | 21.2 wt. % | 191.9 g | 1.7 moles |
| $H_2O_2$ | 8.2 wt. % | 74.2 g | 2.2 moles |
| Active[a] Oxygen | 3.0 wt. % | 27.0 g | 1.7 moles |

[a] Active Oxygen measured as $H_2SO_5$

Based on these results the calculated $H_2O_2$ conversion to $H_2SO_5$ was $(1.7/4.0) \times 100 = 42\%$.

B. Preparation of Caro's Acid/Peracetic Acid Mixture

The Caro's acid mixture was cooled to 25° C., and 240.0 g of glacial acetic acid (4.0 moles) was added at once with rapid stirring. Temperature of the mixture rose to 42° C. The mixture was cooled to 35° C. and stored for one hour. At the end of this period a sample of the mixture was removed to determine its residual hydrogen peroxide and its active oxygen content as peracid (assumed to be a mixture of Caro's acid and peracetic acid). This was done by first analyzing the sample for hydrogen peroxide by the standard ceric sulfate titration method. Potassium iodide was then added to the titrated sample and the active oxygen content of the sample was measured by titrating the iodine released (from the reaction of the iodide with the peracid) with sodium thiosulfate. The results are shown below:

| | | | |
|---|---|---|---|
| $H_2O_2$ | 1.7 wt. % | 19.5 g | 0.6 moles |
| Active[a] Oxygen | 4.5 wt. % | 51.5 g | 3.2 moles |

[a] Active Oxygen as mixed peracids

Based on these results the overall conversion of hydrogen peroxide to peracids was 80%.

Note a: The procedure described here is equivalent to preparing Caro's acid from 50 wt. % hydrogen peroxide (272.2 g, 4.0 moles) and 93 wt. % sulfuric acid (632.8 g, 6.0 moles). For the sake of experimental simplicity, the water required (19.8 g) to dilute the sulfuric acid from 96 to 93 wt. % was combined with the water (77.8 g) required to dilute the 70 wt. % peroxide to 50 wt. %. By adding the water to the peroxide initially, the calculated peroxide strength is 46.7 wt. %.

C. Preparation of Caro's Acid/Peracetic Acid Mixture from Premixed Sulfuric Acid and Acetic Acid A premix was prepared by adding 120.0 g (2.0 moles) of glacial acetic acid to 316.3 g (3.0 moles) of 93 wt. % sulfuric acid, (prepared by adding 298.3 g of 98.6% sulfuric acid to 18.0 g of water), and the mixture was cooled to room temperature. Using a procedure similar to Example 3A, the cooled premix was added to 136.1 g (2.0 moles) of 50 wt. % hydrogen peroxide (prepared by adding 38.9 g of deionized water to 97.2 g of 70 wt. % hydrogen peroxide). The reaction temperature was maintained at 20°–25° C. during the acid premix addition. The reaction mixture was then stirred for one hour and analyzed, and the results were as follows:

| | | | |
|---|---|---|---|
| $H_2O_2$ | 2.27 wt. % | 13.0 g | 0.38 moles |
| Active[a] Oxygen | 4.39 wt. % | 25.1 g | 1.57 moles |

[a] Active Oxygen as mixed peracids

The overall conversion of hydrogen peroxide to the peracids was 79%.

EXAMPLE 4

Effect of Acetic Acid/$H_2O_2$ Mole Ratio on Conversion of $H_2O_2$ to the Peracid Mixture To a one liter jacketed resin kettle, equipped with a mechanical stirrer, dropping funnel, and thermometer was added 123.5 g (2.5 moles) of 68.8 wt. % hydrogen peroxide and the mixture was cooled to 15° C. Agitation rate was set at 300 RPM and 372.7 g (3.75 moles) of 98.6 wt. % sulfuric acid was added slowly, using the dropping funnel, while reaction temperature was kept at 20°–25° C. The reaction mass was stirred for 45 minutes and analyzed, and the following results were obtained:

| | | | |
|---|---|---|---|
| $H_2SO_4$ | 36.23 wt. % | 179.77 g | 1.83 moles |
| $H_2SO_5$ | 42.33 wt. % | 210.04 g | 1.84 moles |
| $H_2O_2$ | 4.29 wt. % | 21.29 g | 0.63 moles |
| Active Oxygen | 5.94 wt. % | 29.47 g | 1.84 moles |

Conversion of hydrogen peroxide to $H_2SO_5$=74%

To a beaker containing 50 g of the above Caro's acid mixture was added slowly, while keeping the temperature of the mixture at about 10° C., 1.90 g (0.032 moles) of glacial acetic acid. The resulting mixture was then analyzed to determine its residual hydrogen peroxide and active oxygen (as a mixture of peracids) content. The procedure was repeated, each time using an increased amount of acetic acid. The effect of increasing the mole ratio of acetic acid to the residual hydrogen peroxide (in the Caro's acid) on conversion of the hydrogen peroxide to peracetic acid is shown below:

| Acetic Acid Added (mole) | Sample Weight (Caro's & Acetic) (g) | Residual $H_2O_2$ (Wt. %) | Residual $H_2O_2$ (mole) | Peracid(s) (% AO) | Concentration(1) (mole) | Conversion(2) Residual $H_2O_2$ to peracid % |
|---|---|---|---|---|---|---|
| 0.000 | 50.0 | 4.28 | 0.063 | 5.94 | 0.166 | 0.0 |
| 0.032 | 51.9 | 1.84 | 0.028 | 5.70 | 0.165 | −1.6 |
| 0.126 | 57.6 | 1.08 | 0.018 | 5.94 | 0.214 | 44.4 |
| 0.188 | 61.3 | 0.54 | 0.010 | 6.09 | 0.233 | 74.6 |
| 0.252 | 65.1 | 0.14 | 0.003 | 6.01 | 0.245 | 93.7 |

Notes:
(1) Moles of peracids expressed as moles of active oxygen
(2) Conversion calculated as shown in the following example for addition of 0.126 moles of acetic acid:

$$[(0.214-0.186)/0.063] \times 100 = 44.4\%$$

where:
Final mole of mixed peracid is 0.214
Initial mole of peracid in Caro's acid is 0.186
Initial mole of $H_2O_2$ in Caro's acid is 0.063

The following examples illustrate the use of mixed peracids of the instant invention for delignifying and bleaching lignocellulosic pulps, and in treatment of cotton or cotton by-products.

EXAMPLE 5

A. Pxa as a Pretreatment Agent for Oxygen Delignification

Figure 2:
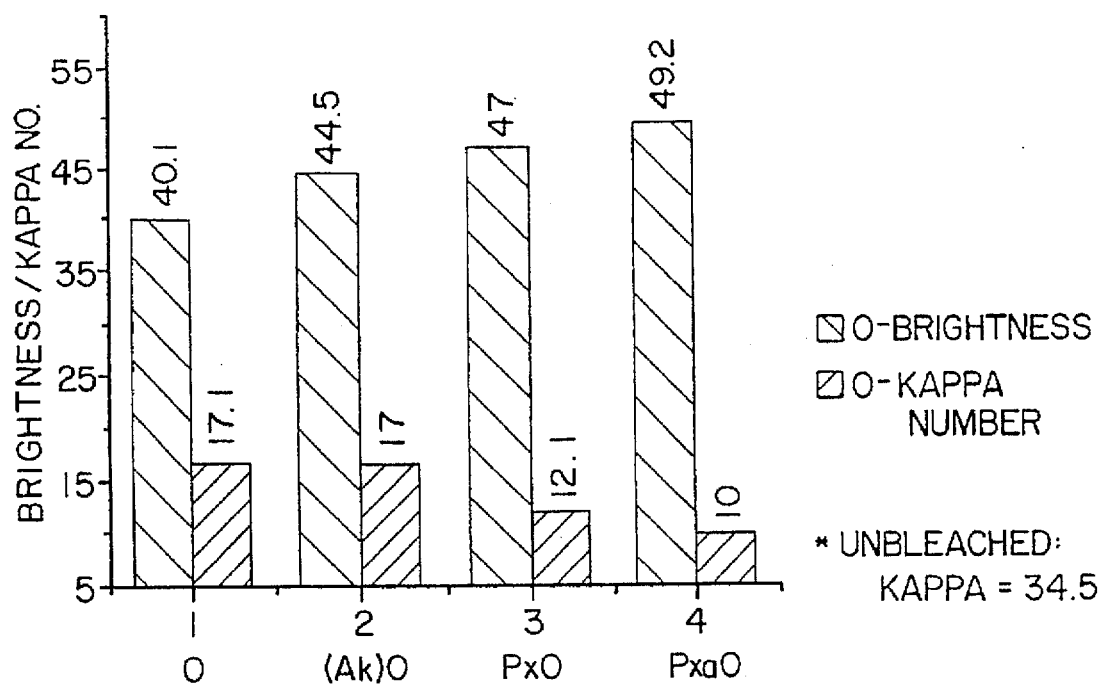
FIG. 2 is a graph illustrating the results obtained when an unbleached kraft pulp was treated with the peracid mixtures of the instant invention, referred to as Pxa, and peroxymonosulfuric acid (Caro's acid), referred to as Px, and both samples then subjected to oxygen delignification under the same conditions.

An unbleached kraft pulp (kappa number 34.5) was treated with Pxa and Px separately. In both treatments, 1% equivalent of $H_2O_2$ based on pulp was added and the pulp samples were treated under the same conditions (70° C., 10% consistency, 1 hour). Both samples were subjected to oxygen delignification under the same conditions. The results are shown in FIG. 2. Compared with oxygen delignification without pretreatment or with acid pretreatment in the presence of chelating agent, (Ak)O, pretreatments with Px and Pxa gave much lower kappa number and higher brightness at a given viscosity as shown in FIG. 2. However, pretreatment with Pxa gave better results than pretreatment with Px.

B. Comparison of Pxa and Caro's Acid (Px)

Southern pine kraft pulp produced by Modified Continuous Cooking (MCC) was oxygen delignified (OD) to yield pulp of kappa number 7.51, 42% ISO, and 17.6 cP viscosity. This pulp was treated in two chelation stages, designated as Q-stages, at 10% consistency with 0.2% (wt/wt OD pulp) of the sodium salt of diethylene-triaminepentaacetic acid (DTPA), and washed with deionized water after each stage. The Q-stages were 40 minutes, 70° C., pH 6-7; and 80 minutes, 80° C., pH 4-4.5, respectively. The resulting pulp was split in equal portions and treated for 4 hours with 4% (wt/wt OD pulp) hydrogen peroxide, 0.8% DTPA, 0.05% Epsom salts, at an initial pH of 11.8. One portion was held at 90° C., the other at 80° C. Brightnesses, L a b values, kappas and viscosities are show in column 1 of the following table.

The peroxide treated pulps were also split in equal portions and treated with either a Caro's acid solution (Px) prepared as in Example 2, or Caro's acid/peracetic acid solution (Pxa) prepared as in Example 3B. In both Px and Pxa treatments, 1% equivalent hydrogen peroxide based on pulp was used. Other reaction conditions were 4 hours, 80° C., 10% consistency, 0.08% DTPA and NaOH sufficient to achieve an initial pH of 7-8. Results after washing are also shown in columns 2 and 3 of the table below.

In both cases the Px treatment resulted in approximately 38-45% delignification but did not significantly improve the pulp brightness, whereas the Pxa treatment gave approximately 60% delignification and 7-8 points higher brightness. The Pxa treated pulp also appeared substantially less yellow, as shown by the lower b values. Pulp viscosity was not significantly affected by either peracid stage.

| | P-stage at 90° C. | | |
|---|---|---|---|
| | 1 OOP | 2 OOPPx | 3 OOPPxa |
| ISO, % | 79.2 | 80.0 | 86.4 |
| L | 94.3 | 94.8 | 96.1 |
| a | −1.33 | −1.36 | −1.20 |
| b | 7.52 | 7.23 | 4.41 |
| kappa | 2.74 | 1.49 | 1.13 |
| viscosity (cP) | 8.0 | 7.1 | 7.9 |

| | P-stage at 80° C. | | |
|---|---|---|---|
| | 4 OOP | 5 OOPPx | 6 OOPPxa |
| ISO, % | 76.4 | 76.0 | 84.3 |
| L | 94.1 | 93.5 | 95.7 |
| a | −1.13 | −1.69 | −1.39 |
| b | 9.48 | 8.69 | 5.56 |
| kappa | 3.23 | 2.01 | 1.37 |
| viscosity (cP) | 13.0 | 12.6 | 12.3 |

C. Comparison of Pxa and Peracetic Acid (Pa)

Figure 3:
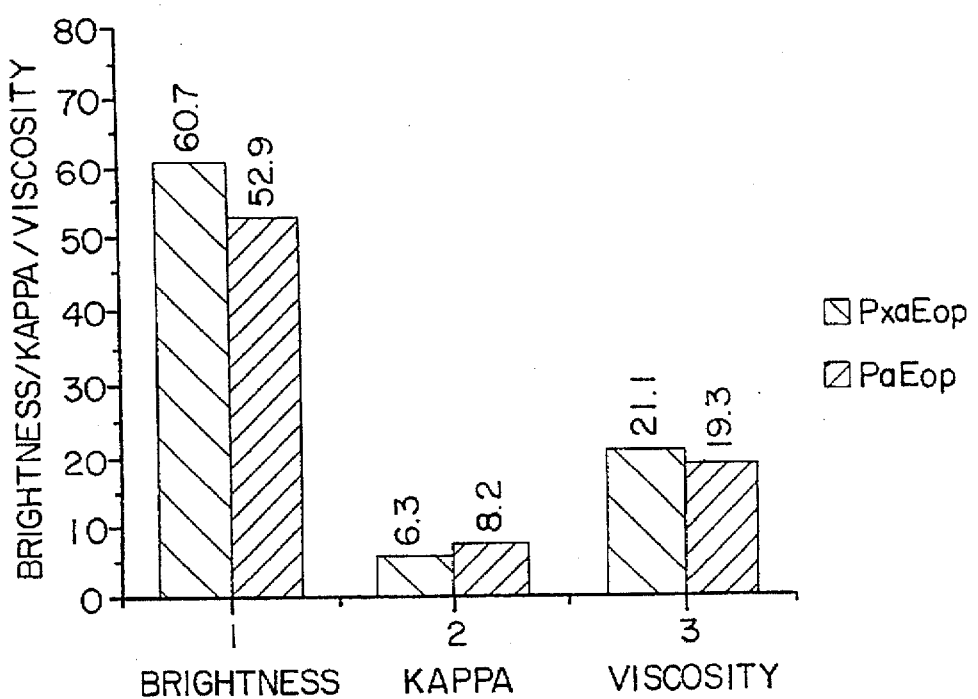
FIG. 3 is a graph illustrating the results obtained when one pulp was treated with Pxa followed by an oxidative extraction stage reinforced by both oxygen and hydrogen peroxide and the other pulp was treated with peracetic acid, referred to as Pa, followed by the same oxidative extraction stage reinforced by both oxygen and hydrogen peroxide.

An oxygen delignified kraft pulp produced by a mill in southern USA using a Modified Continuous Cooking (MCC) process (kappa number 12.9) was used. In one treatment, the pulp was treated with Pxa followed by an oxidative extraction stage reinforced by both oxygen and hydrogen peroxide (Eop). In another treatment, the pulp was treated with Pa followed by the same oxidative extraction stage. In both Pxa and Pa treatments, 1% equivalent of $H_2O_2$ based on pulp was used. All other conditions are identical for both treatments. The results are shown in FIG. 3 of the drawings. The pulp treated with the PxaEop sequence gave higher brightness and viscosity and lower kappa number than the pulp treated with the PaEop sequence.

EXAMPLE 6

Non-Chlorine Bleaching Sequences Using Pxa

Figure 4:
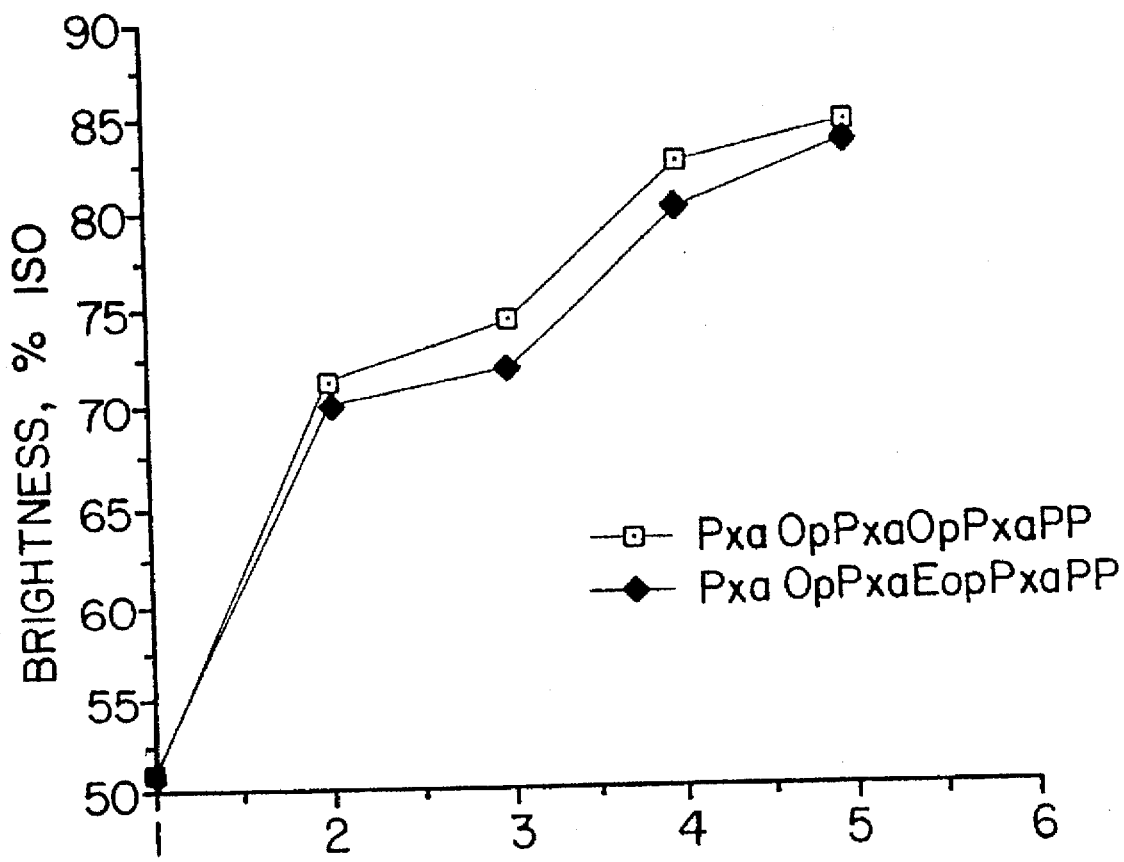
FIG. 4 is a graph illustrating the results achieved when a kraft pulp was treated with two different bleaching sequences utilizing applicants' mixed peracid solution pretreatment and without any use of chlorine-containing bleaching agents.

A kraft pulp produced by a mill in Southern USA using MCC process (kappa number 23.7) with PxaOpPxaOpPxaPP and PxaOpPxaEopPxaPP sequences. Both sequences gave a final brightness of about 85% ISO without any use of chlorine-containing bleaching agent as shown in FIG. 4 of the drawings.

EXAMPLE 7

Bleaching of Second-Cut Cotton Linters Using Pxa

Cotton linters were pretreated with 4.5% NaOH solution at 80 psi for 3.5 hours and washed at the mill to increase the material's brightness from 32 to 47% ISO. The linters were then treated in the laboratory with 1% Pxa (on dry weight of cotton linters; 1% charged is as $H_2O_2$ based on the initial amount of $H_2O_2$ used to prepare the Pxa solution) for 60 minutes at 100° F. at pH 8 and 6% consistency. The pH was adjusted with dilute NaOH solution prior to heating. The brightness measure after washing had improved to 77.7% ISO. A sample treated with 1% $H_2O_2$, pH 9, for 60 minutes at 100° F. achieved a brightness of 52.9% ISO. The brightness increase for Pxa treated sample, therefore, was about 25% ISO versus the $H_2O_2$ treated sample. The Pxa treated sample was further bleached to 81.7 ISO brightness with 2% hydrogen peroxide, 1.25% NaOH, for 80 minutes at 140° F. and 12% consistency.

EXAMPLE 8

Bleaching of Second-cut Cotton Linters Using Pxa

Second-cut cotton linters, pretreated with NaOH as above, were bleached with Pxa (1% $H_2O_2$ equivalent on a dry weight basis) at pH 10 (Sample A), and with 2% Pxa at pH 8 (Sample B) using conditions of Example 7. Brightness of the samples A and B, after the Pxa treatment, followed by washing, was 75.5 and 75.4 respectively. A sample bleached under the same conditions using Caro's acid (1% $H_2O_2$ equivalent basis) had a brightness of 60.2 ISO. Therefor, brightness increase for Pxa versus Px was about 15% ISO. The Caro's acid was prepared following the procedure of Example 2. Sample A and B were subsequently bleached using 2% $H_2O_2$ under conditions similar to example 7 and attained brightness of 83.2 and 82.9 ISO; respectively.

It will be understood that various details of the invention may be changed without departing from the scope of the invention. Furthermore, the foregoing description is for the purpose of illustration only, and not for the purpose of limitation—the invention being defined by the claims.

We claim:

1. A process for oxidatively treating a substrate which comprises contacting said substrate with a mixed peracid solution which is an equilibrium mixture of Caro's acid and a percarboxylic acid of the formula $RCO_3H$ wherein R is an alkyl group of from 1 to 5 carbon atoms prepared by a process for preparing a bleaching liquor containing a mixture of percarboxylic acid and Caro's acid which comprises mixing a carboxylic acid of the formula $RCO_2H$ wherein R is an alkyl group of from 1 to 5 carbon atoms with an equilibrium solution of Caro's acid containing an initial amount of hydrogen peroxide and sulfuric acid wherein the mole ratio of carboxylic acid to the initial amount of hydrogen peroxide is maintained in the range of from 0.3 to 1.5 and the mole ratio of sulfuric acid to the initial amount of hydrogen peroxide is maintained in the range of from 0.4 to 3.0, and wherein the concentration of $H_2O_2$ is sufficient to permit the overall conversion of $H_2O_2$ of approximately 60–90%.

2. The process of claim 1, wherein additionally other oxidative agents are included in various process steps.

3. The process of claim 1 wherein the percarboxylic acid is peracetic acid.

4. A process for delignifying and bleaching a lignocellulosic material which comprises contacting the material with a mixed peracid solution which is an equilibrium mixture of Caro's acid and a percarboxylic acid of the formula $RCO_3H$ wherein R is an alkyl group of from 1 to 5 carbon atoms prepared by a process for preparing a bleaching liquor containing a mixture of percarboxylic acid and Caro's acid which comprises mixing a carboxylic acid of the formula $RCO_2H$ wherein R is an alkyl group of from 1 to 5 carbon atoms with an equilibrium solution of Caro's acid containing an initial amount of hydrogen peroxide and sulfuric acid wherein the mole ratio of carboxylic acid to the initial amount of hydrogen peroxide is maintained in the range of from 0.3 to 1.5 and the mole ratio of sulfuric acid to the initial amount of hydrogen peroxide is maintained in the range of from 0.4 to 3.0, and wherein the concentration of $H_2O_2$ is sufficient to permit the overall conversion of $H_2O_2$ of approximately 60–90%.

5. The process of claim 4, wherein additionally other oxidative agents are included in various process steps.

6. The process of claim 4 in which the lignocellulosic material is recycled paper or a lignocellulosic pulp selected from Kraft, sulfite, soda, NSSC and organosolv pulp.

7. The process of claim 4 in which the lignocellulosic material is selected from wood, wood chips, and pulps of non-wood fibrous plants.

8. A process for bleaching a cellulosic material selected from delignified pulp, cotton, cotton by-products and non-wood plants, which comprises contacting said material with a mixed peracid solution which is an equilibrium mixture of Caro's acid and a percarboxylic acid of the formula $RCO_3H$ wherein R is an alkyl group of from 1 to 5 carbon atoms prepared by a process for preparing a bleaching liquor containing a mixture of percarboxylic acid and Caro's acid which comprises mixing a carboxylic acid of the formula $RCO_2H$ wherein R is an alkyl group of from 1 to 5 carbon atoms with an equilibrium solution of Caro's acid containing an initial amount of hydrogen peroxide and sulfuric acid wherein the mole ratio of carboxylic acid to the initial amount of hydrogen peroxide is maintained in the range of from 0.3 to 1.5 and the mole ratio of sulfuric acid to the initial amount of hydrogen peroxide is maintained in the range of from 0.4 to 3.0, and wherein the concentration of $H_2O_2$ is sufficient to permit the overall conversion of $H_2O_2$ of approximately 60–90%.

9. The process of claim 8, wherein additionally other oxidative agents are included in various process steps.

* * * * *